(12) United States Patent
Frederiksen et al.

(10) Patent No.: US 11,368,673 B2
(45) Date of Patent: Jun. 21, 2022

(54) DEVICE DESIGNED FOR DETECTING A SOILING OF AT LEAST ONE TRANSMITTING WINDOW AND/OR ONE RECEIVING WINDOW OF A SENSOR

(71) Applicant: Robert Bosch GmbH, Stuttgart (DE)

(72) Inventors: Annette Frederiksen, Renningen (DE); Stefanie Hartmann, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 17/043,104

(22) PCT Filed: Jun. 3, 2019

(86) PCT No.: PCT/EP2019/064267
§ 371 (c)(1),
(2) Date: Sep. 29, 2020

(87) PCT Pub. No.: WO2019/233917
PCT Pub. Date: Dec. 12, 2019

(65) Prior Publication Data
US 2021/0067769 A1   Mar. 4, 2021

(30) Foreign Application Priority Data

Jun. 7, 2018   (DE) .......................... 102018209020.3

(51) Int. Cl.
*H04N 7/18*      (2006.01)
*H04N 17/00*   (2006.01)
(Continued)

(52) U.S. Cl.
CPC .......... *H04N 17/002* (2013.01); *G01S 7/497* (2013.01); *G02B 5/32* (2013.01); *G03H 1/0248* (2013.01);
(Continued)

(58) Field of Classification Search
CPC ............... G01C 3/02; G01N 2021/157; G01N 2021/945; G03F 7/001; G03F 7/027;
(Continued)

(56) References Cited

U.S. PATENT DOCUMENTS 6,307,198 B1 * 10/2001 Asakura ................ B60S 1/0822
340/602
2008/0212151 A1   9/2008 Wolf et al.
(Continued)

FOREIGN PATENT DOCUMENTS

DE         19512864 C1   8/1996
DE         19530289 A1   2/1997
(Continued)

OTHER PUBLICATIONS

International Search Report for PCT/EP2019/064267, dated Sep. 25, 2019.

*Primary Examiner* — Masum Billah
(74) *Attorney, Agent, or Firm* — Norton Rose Fulbright US LLP; Gerard Messina

(57) ABSTRACT

A device for detecting a soiling of a transparent cover of at least one transmitting window and/or one receiving window of an optical sensor. The device includes at least one hologram structure, an image sensor, and a processing unit. The at least one hologram structure is designed to at least partially deflect light beams incident through the transparent cover, or light beams reflected by an inner side of the transparent cover, in the direction of the image sensor. The image sensor is designed to detect at least one image signal as a function of the deflected light beams, and the processing unit is designed to detect a soiling of the transparent cover as a function of the at least one detected image signal. An optical sensor including the device, and a method for detecting a soiling of the transparent cover, are also described.

17 Claims, 8 Drawing Sheets

(51) Int. Cl.
*G01S 7/497* (2006.01)
*G02B 5/32* (2006.01)
*G03H 1/02* (2006.01)
*G03H 1/28* (2006.01)
*G06T 7/00* (2017.01)
*H04N 5/225* (2006.01)
*H04N 9/04* (2006.01)

(52) U.S. Cl.
CPC ............ *G03H 1/28* (2013.01); *G06T 7/0002* (2013.01); *H04N 5/2252* (2013.01); *H04N 5/2256* (2013.01); *H04N 9/045* (2013.01); *G01S 2007/4975* (2013.01); *G06T 2207/30168* (2013.01); *G06T 2207/30252* (2013.01)

(58) Field of Classification Search
CPC ........ G03F 7/035; G03F 7/032; G03F 7/0045; G03F 7/031; G03F 7/029; G03F 7/028; G03F 7/20; G03F 7/00
USPC .......................................................... 348/148
See application file for complete search history.

(56) References Cited

U.S. PATENT DOCUMENTS

2015/0293498 A1* 10/2015 Picart ................... G03H 1/0443
                                                              348/40
2016/0041525 A1*  2/2016 Utsugi ................. G11B 7/1353
                                                              359/22

FOREIGN PATENT DOCUMENTS

| | | |
|---|---|---|
| DE | 19701258 A1 | 7/1997 |
| DE | 10049401 A1 | 4/2002 |
| DE | 10229239 A1 | 1/2004 |
| DE | 10314704 A1 | 10/2004 |
| DE | 102005062785 A1 | 7/2007 |
| DE | 102010028347 A1 | 11/2011 |
| DE | 102013210887 A1 | 12/2014 |
| EP | 0736426 A1 | 10/1996 |
| EP | 0999104 A2 | 5/2000 |
| WO | 2014005585 A1 | 1/2014 |
| WO | 2019141644 A1 | 7/2019 |

* cited by examiner

DEVICE DESIGNED FOR DETECTING A SOILING OF AT LEAST ONE TRANSMITTING WINDOW AND/OR ONE RECEIVING WINDOW OF A SENSOR

FIELD

The present invention relates to a device designed for detecting a soiling of at least one transmitting window and/or one receiving window of a sensor.

BACKGROUND INFORMATION

To protect against soiling due to dust or water, for example, the transmitting and/or receiving windows of surroundings sensors, such as LIDAR sensors or cameras are protected toward the outside by transparent covers. However, the soiling may also settle on the covers, whereby the optical path of the sensor may be impaired.

To detect a soiling on a windshield of a vehicle, PCT Application No. WO 2014/005585A1 describes, for example, to detect the state of a pane with the aid of a "surround" camera.

It is an object of the present invention to develop a simplified device for detecting a soiling of a transparent cover of at least one transmitting window and/or one receiving window of an optical sensor.

SUMMARY

In accordance with an example embodiment of the present invention, a device for detecting a soiling of a transparent cover of at least one transmitting window and/or one receiving window of an optical sensor is provided. The optical sensor is, in particular, an optical surroundings sensor of a vehicle. The example device includes at least one hologram structure, which in this connection is designed to at least partially deflect light beams which are incident through the transparent cover in the direction of an image sensor. The light beams are, in particular, incident from outside surroundings of the device through the transparent cover. As an alternative, the hologram structure is designed to at least partially deflect light beams which are reflected by an inner side of the transparent cover in the direction of the image sensor. The inner side in this context refers to the side of the transparent cover which is directed in the direction of the hologram structure and the image sensor. In both instances, the image sensor of the device is designed to detect an image signal as a function of the deflected light beams reaching the image sensor. The device furthermore includes a processing unit, which is designed to detect a soiling of the transparent cover as a function of the at least one detected image signal.

The processing unit is preferably designed to ascertain a mapping of a surface of the transparent cover as a function of the at least one detected image signal. The mapping may, for example, represent a complete mapping of the surface of the inner side or of the outer side of the transparent cover in the process. The processing unit may, in turn, detect a soiling of the transparent cover as a function of the ascertained mapping in the process. The mapping may, in particular, be designed as a color map. In this case, the soiling of the surface may, in particular, be realistically represented in the appropriate color.

The at least one hologram structure is preferably designed as a volume hologram. A volume hologram is characterized in that light beams reaching the volume hologram are not refracted, but diffracted. Only light beams having a certain wavelength and/or a certain incidence angle on the volume hologram are diffracted in the direction of the image sensor. The volume hologram is transparent to light beams having a wavelength different therefrom and/or a different incidence angle, and the light beams are able to pass through the volume hologram without deflection. The diffraction characteristic of such a volume hologram as a holographic optical element (HOE) is defined during the recording of the HOE by the angles of incidence and/or wavelengths used there. The diffraction characteristic of the volume hologram may thus be set, for example, in such a way that the optical function of the optical sensor is not impaired. In the case of a LIDAR sensor, the volume hologram may, for example, be designed to be transparent to infrared beams emitted and/or received by the LIDAR sensor, and to thus not diffract them. The infrared beams may pass through the volume hologram without impairment, and the optical sensor may continue to carry out its optical function. The volume hologram preferably includes a volume grating. These holographic diffraction gratings are exposed in a film and may be designed as reflection gratings or as transmission gratings. In the case of the transmission volume grating, the volume grating is designed to transmit the light beams incident through the transparent cover or the beams reflected by the inner side of the transparent cover. This means that the light beams which are diffracted in the direction of the image sensor are transmitted through the transmission hologram. In the case of the reflection volume grating, the volume grating is designed to reflect the light beams incident through the transparent cover, or the light beams reflected by the inner side of the transparent cover, in the direction of the image sensor as a function of the wavelength of the incident light beams and/or the incidence angle of the incident light beams.

The image sensor is preferably designed as a CCD image sensor. Such a CCD image sensor includes a matrix made up of a multitude of light-sensitive photodiodes, which are also referred to as pixels. Depending on the illumination of such a pixel, an image point is generated on a mapping. Each pixel is assigned a defined area of the transparent cover to be mapped in the process. The at least one hologram structure is designed to deflect the light beams incident in the defined areas of the transparent cover to be mapped onto the pixels of the CCD image sensor which are assigned to the respective defined area. As an alternative, the hologram structure is designed to deflect the light beams reflected at the defined areas of the inner side of the transparent cover onto the assigned pixel of the CCD image sensor. In this way the option exists to generate a mapping of the transparent cover. As a result of the generated mapping, a possible soiling on the transparent cover may be localized. The CCD image sensor preferably includes a multitude of red, green and blue. This means, for example, that only visible light which corresponds to a wavelength of the color red reaches a red pixel. In this way, a color map of the transparent cover may be generated. Furthermore, the CCD image sensor may preferably additionally include a multitude of infrared pixels. In this way, simultaneously the option exists to also detect the infrared component of the light.

The at least one hologram structure is preferably designed as a layer including multiple superimposed holograms. Each of the multiple holograms is designed in the process to differently diffract the light beams incident through the transparent cover, or the light beams reflected by the inner side of the transparent cover, in each case in the direction of the image sensor as a function of the wavelength of the light beams and/or the incidence angle of the light beams. This method of superimposing multiple holograms in one layer, which is also referred to as holographic multiplexing, for example, results in the option of assigning a certain pixel of the image sensor to a defined area of the transparent cover. The resolution of the resulting mapping is determined by the number of the superimposed holograms and the pixels of the image sensor. As an alternative, the at least one hologram structure is formed from multiple consecutively situated holograms. The hologram structure is made up of a stack of multiple individual hologram layers. The individual holograms are designed in the process to diffract the light beams incident through the transparent cover, or the light beams reflected by the inner side of the transparent cover, differently in each case in the direction of the image sensor as a function of the wavelength of the light beams and/or the incidence angle of the light beams. This also results in the option, for example, to assign a certain pixel of the image sensor to a defined area of the transparent cover. The resolution of the resulting mapping is determined by the number of the holograms in the stack and the pixels of the image sensor.

The device preferably additionally includes at least one first illumination unit, which is designed to illuminate the inner side of the transparent cover. The illumination is carried out in such a way that the light beams emitted by the first illumination unit are reflected at the inner side of the transparent cover in the event of soiling of the transparent cover. In this connection, the at least one hologram structure is designed to at least partially deflect the light beams emitted by the first illumination unit and reflected at the inner side of the transparent cover in the direction of the image sensor. The image sensor is, in turn, designed to detect an image signal, and the processing unit identifies a soiling of the transparent cover as a function of the detected image signal.

The device preferably includes at least one second illumination unit, which is designed to illuminate an outer side of the transparent cover in such a way that the light beams emitted by the second illumination unit are reflected at the outer side in the event of soiling of the transparent cover. The outer side of the transparent cover in this connection refers to the side of the transparent cover which is directed away from the direction of the at least hologram structure and the image sensor. In this connection, the at least one hologram structure is designed to at least partially deflect the light beams emitted by the second illumination unit and incident through the outer side of the transparent cover in the direction of the image sensor. The image sensor is, in turn, designed to detect an image signal, and the processing unit identifies a soiling of the transparent cover as a function of the detected image signal.

The device preferably includes at least one third illumination unit, which is designed to illuminate the transparent cover laterally from above or from below in such a way that the light beams emitted by the third illumination unit are deflected in the direction of the hologram structure in the event of soiling of the transparent cover. The at least one hologram structure is designed to at least partially deflect the light beams emitted by the third illumination unit and deflected in the direction of the hologram structure in the direction of the image sensor. The image sensor is, in turn, designed to detect an image signal, and the processing unit identifies a soiling of the transparent cover as a function of the detected image signal. The device preferably additionally includes at least one fourth illumination unit, which is also designed to illuminate the transparent cover laterally from above or from below in such a way that the light beams emitted by the third illumination unit are deflected in the direction of the hologram structure in the event of soiling of the transparent cover. The fourth illumination unit is situated opposite the third illumination unit, whereby each of the two illumination units thus radiate in the direction of the other illumination unit.

Illumination units such as the above-described first, second, third or fourth illumination units offer the advantage that a uniform illumination of the transparent cover may be generated, which, in turn, is advantageous for the comparability of the deflected, detected light beams and the image signal resulting therefrom. A further advantage of the external illumination is that a soiling of the transparent cover may be detected both during the day and at night. The first, second, third and/or fourth illumination unit(s) may be designed as LEDs, for example.

In accordance with an example embodiment of the present invention, an optical sensor, which includes the above-described device for detecting a soiling of a transparent cover of at least one transmitting window and/or one receiving window of an optical sensor, in provided. The optical sensor, which may, in particular, be designed as an optical surroundings sensor of a vehicle, additionally includes a housing including at least one transmitting window and/or at least one receiving window of the sensor. The transmitting window and/or the receiving window refers to the section of the housing which is designed to allow generated sensor radiation or a received signal for the sensor to pass through. The optical sensor furthermore includes a transparent cover, which is designed to cover the at least one transmitting window and/or the at least one receiving window of the optical sensor with respect to exterior surroundings of the optical sensor. At least one hologram structure of the device according to the present invention is situated inside the housing in such a way that light beams incident through the transparent cover, or light beams reflected by an inner side of the transparent cover, are at least partially deflected in the direction of an image sensor which is also situated inside the housing. The image sensor is, in turn, designed to detect at least one image signal as a function of the deflected light beams. A processing unit identifies a soiling of the transparent cover as a function of the detected image signal. The processing unit is preferably designed to ascertain a mapping of a surface of the transparent cover as a function of the at least one detected image signal, and to identify a soiling of the transparent cover as a function of the ascertained mapping. The optical sensor is preferably a LIDAR sensor. Such LIDAR sensors may be designed as scanning or as rotating LIDAR sensors and include a transparent cover, which protects the optical sensor against the ingress of water into the housing, for example.

The hologram structure is preferably situated on a curved outer side of a receiving lens system of the LIDAR sensor as an optical sensor. The material of which the hologram structure is made may be applied in the liquid state onto the curved outer side of the receiving lens system in the process. Thereafter, the hologram structure is exposed and then cured. As an alternative, the hologram structure may also be designed as a film and be situated on the outer side of the receiving lens system. The film has, in particular, a thickness of approximately 100 μm. To protect against the surroundings and for improved handling, the applied hologram structure is, for example, covered by a protective layer made up of polycarbonate or polyamide. Situating the hologram structure on the outer side of the receiving lens system offers the option of using the image sensor of the LIDAR sensor also as an image sensor for the device according to the present invention. The pixels on the image sensor are preferably distributed in such a way that the function of the surroundings detection by the LIDAR sensor is not limited by the additional detection of the soiling of the transparent cover. For this purpose, for example, comparatively more infrared pixels may be situated on the image sensor than red, green and blue, or also alternatively monochrome, pixels. The optical filter function required for this purpose may, for example, be implemented with a holographic cascade filter, which is implemented from a specific angular or multi-stage arrangement of reflection or transmission holograms. In accordance with an example embodiment of the present invention, a method is provided for detecting a soiling of a transparent cover of at least one transmitting window and/or one receiving window of an optical sensor. The example method is carried out with the aid of the above-described device according to the present invention.

DETAILED DESCRIPTION OF EXAMPLE EMBODIMENTS

Figure 1:
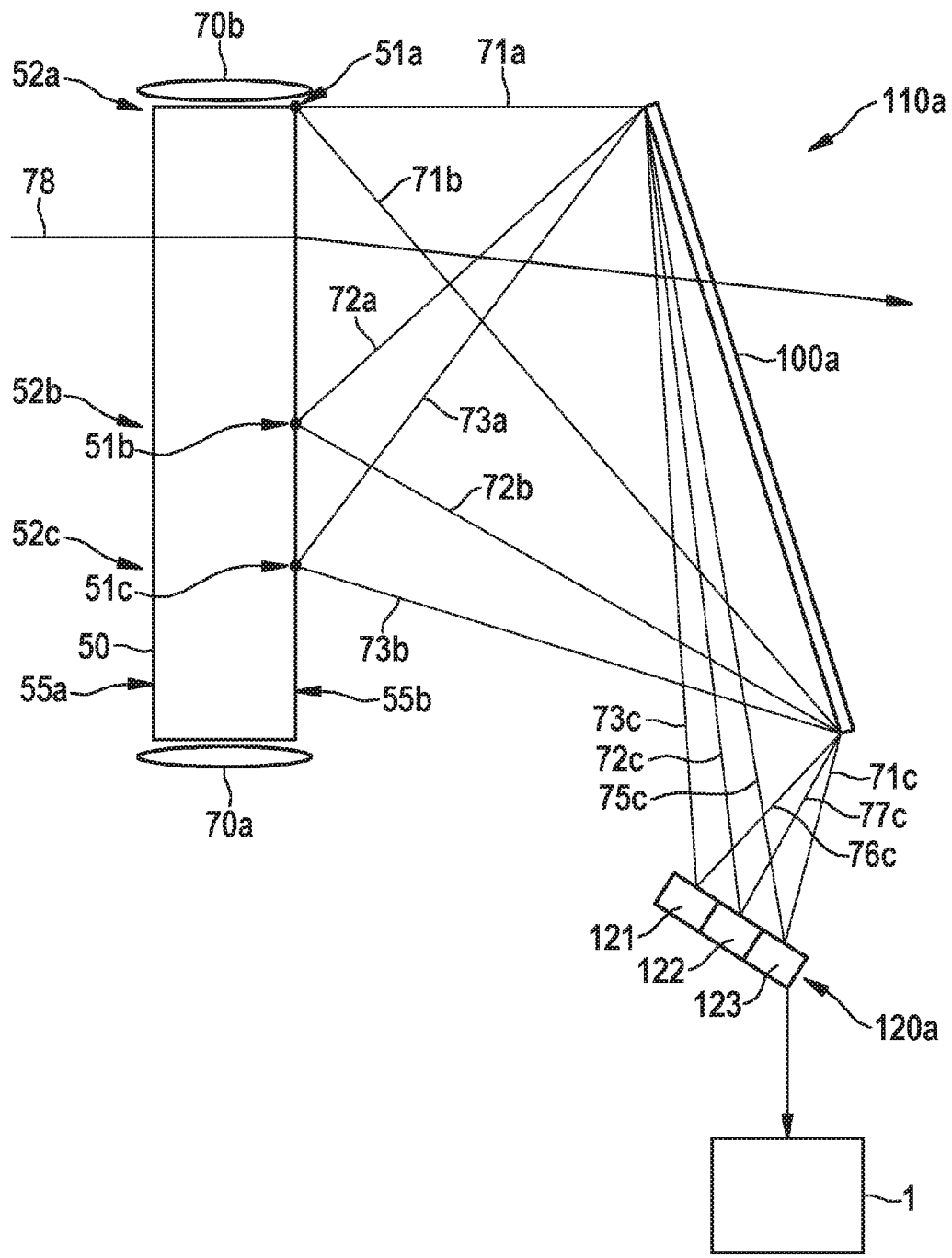
FIG. 1 shows a first specific embodiment of the device according to the present invention.

FIG. 1 shows a schematic illustration of a first specific embodiment of a device 110a for detecting a soiling 51a, 51b and 51c of a transparent cover 50 of at least one transmitting window and/or one receiving window of an optical sensor, in accordance with the present invention.

Device 110a includes a hologram structure 100a in the process, which is designed as a holographic optical element (HOE), for example. Device 110a additionally includes an image sensor 120a and a processing unit 130. In this first specific embodiment, device 110a additionally includes a third illumination unit 70a, which illuminates the transparent cover laterally from below in such a way that the light beams are reflected and deflected in the direction of hologram structure 100a in the event of soiling 51, 51b and 51c. Moreover, a fourth illumination unit 70b is provided, which illuminates the transparent cover laterally from above in such a way that the light beams are reflected and deflected in the direction of hologram structure 100a in the event of soiling 51, 51b and 51c. Hologram structure 100a, in turn, is used to deflect the reflected beams 71a, 71b, 72a, 72b, 73a and 73b in the direction of image sensor 120a.

In this first specific embodiment, image sensor 120a is designed as an image sensor including a multitude of pixels 121, 122 and 123. Each pixel 121, 122 and 123 is assigned a defined area 52a, 52b or 53c of transparent cover 50. In this case, for example, pixel 121 is assigned area 52a of transparent cover 50. Hologram structure 100a deflects the reflected light beams 71a, 71b, 72a, 73a and 73b in such a way that the deflected light beams 71c, 72c, 73c, 75c, 76c and 77c incident on pixel 121, 122 or 123 assigned to the respective area 52a, 52b or 53c. For this purpose, hologram structure 100a may, for example, be formed from multiple consecutively situated holograms. The individual holograms are each differently designed and deflect reflected light beams 71a, 71b, 72a, 72b, 73a and 73b in the direction of the respective pixel 121, 122 or 123 as a function of the wavelength of light beams 71a, 71b, 72a, 73a and 73b and/or the incidence angle of light beams 71a, 71b, 72a, 72b, 73a and 73b. As an alternative, multiple optical functions may be stored by holographic multiplexing in a layer of hologram structure 100a, and light beams 71c, 72c, 73c, 75c, 76c and 77c may thus be deflected onto corresponding pixel 121, 122 or 123.

In this case, hologram structure 100a is designed as a volume hologram, which is designed to reflect the reflected light beams 71a, 71b, 72a, 72b, 73a and 73b in the direction of the image sensor. The volume hologram is transparent to light beams 78 which have a different wavelength and/or a different incidence angle compared to light beams 71a, 71b, 72a, 72b, 73a and 73b, and light beams 78 may pass through the volume hologram without deflection.

Device 110a additionally includes a processing unit 130, which is designed to detect a soiling 51a, 51b or 51c of transparent cover 50 as a function of the at least one detected image signal. In this first specific embodiment of device 110a, processing unit 130 is designed to ascertain a mapping of a surface of transparent cover 50. With the aid of image sensor 120, which is designed as a CCD image sensor, for example, processing unit 130 receives image signals, from which a monochrome or even a color map of the surface of transparent cover 50 may be generated. For example, white dots on the generated mapping may indicate a soiling 51, 51b and 51c.

Figure 2:
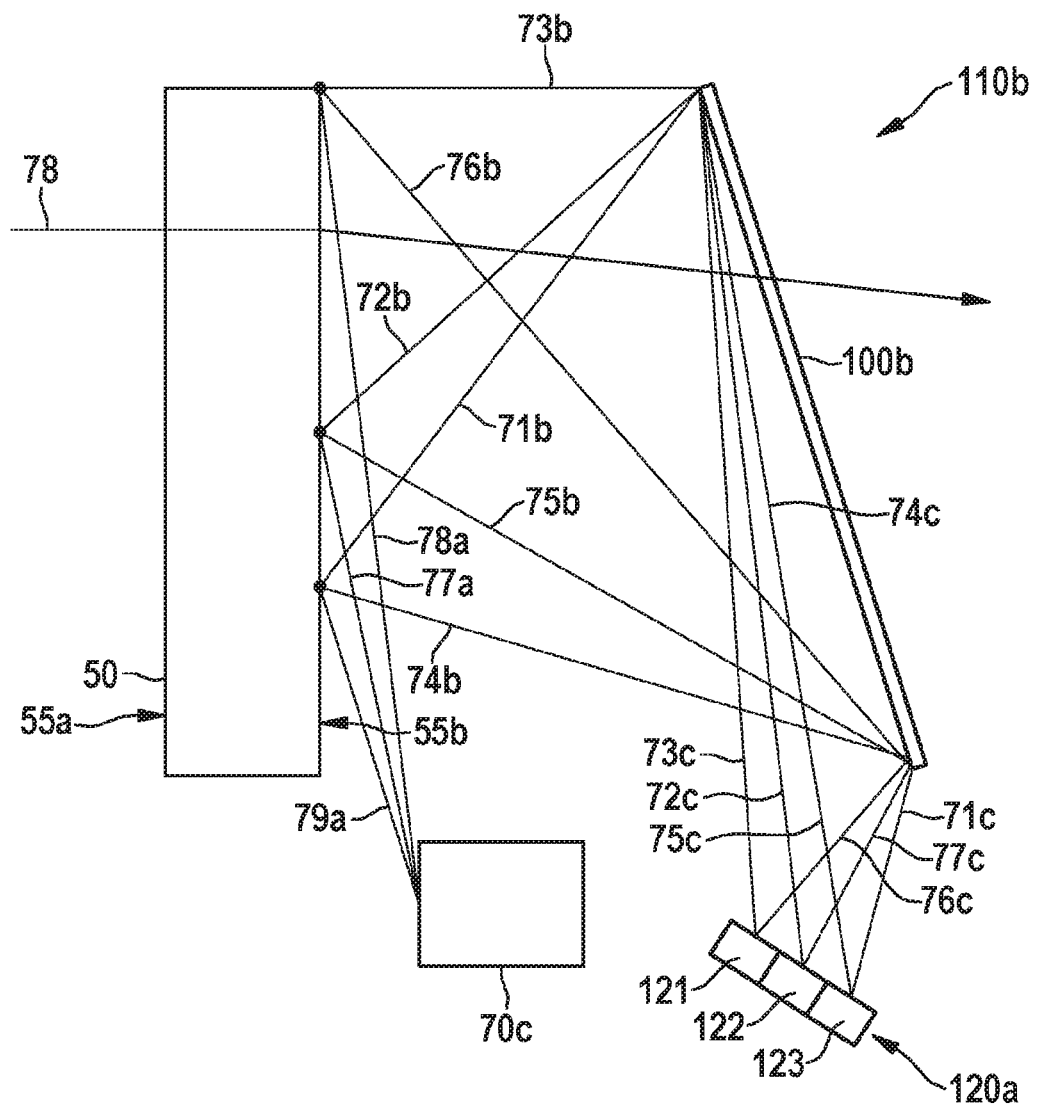
FIG. 2 shows a second specific embodiment of the device according to the present invention.

FIG. 2 schematically shows a representation of a second specific embodiment of a device 110b for detecting a soiling 51a, 51b and 51c of a transparent cover 50 of at least one transmitting window and/or one receiving window of an optical sensor, in accordance with the present invention.

In contrast to the first specific embodiment in FIG. 1, a first illumination unit 70c is provided, which illuminates the inner side of transparent cover 50 in such a way that the light beams emitted by first illumination unit 70a are reflected at inner side 55b of transparent cover 50 in the event of soiling 51a, 51b and 51c of transparent cover 50.

Figure 3:
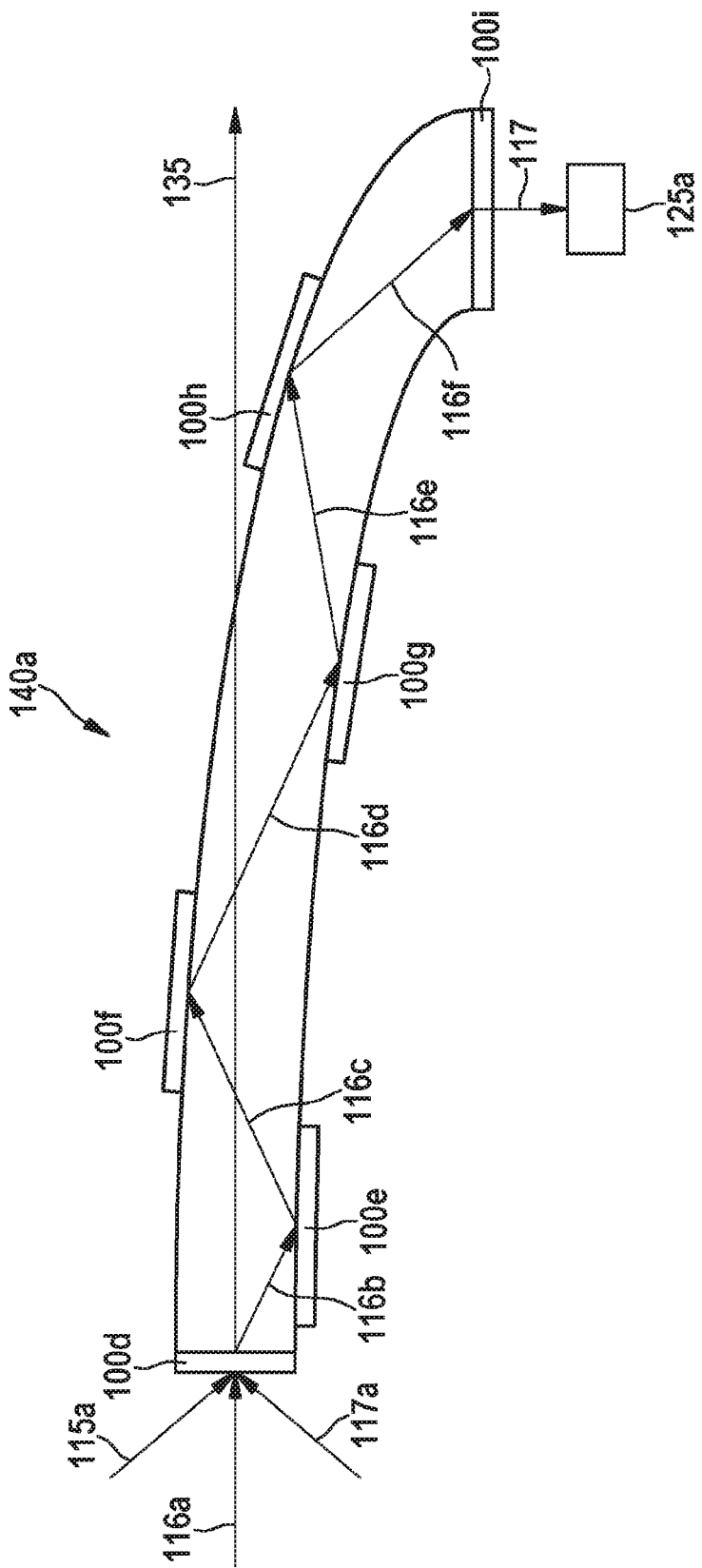
FIG. 3 shows a first specific embodiment of a holographic cascade filter.

FIG. 3 schematically shows a first specific embodiment of a holographic cascade filter 140, in accordance with the present invention.

This holographic cascade filter 140 serves as a filter unit for light beams which do not have a defined wavelength range and/or entrance angle range. First hologram 100a is designed as a transmission hologram and is used to deflect incident light which has the defined wavelength range and/or entrance angle range in the direction of a downstream second hologram 100e. Incident light beams 116a which are not situated within the defined wavelength range and/or entrance angle range may pass through first hologram 100d linearly without deflection.

Second hologram 100e is designed as a reflection hologram and is also designed to reflect only incident light beams 116b which have a defined wavelength range and/or a defined entrance angle range onto a downstream third reflection hologram 100f. In this way, incrementally more and more light beams which do not correspond to a defined wavelength range and/or a defined entrance angle range are filtered out.

In this first specific embodiment, holographic cascade filter 140 is designed in a curved shape and, after multiple reflections and corresponding filtering at one of reflection holograms 100e, 100f, 100g and 100g, a light beam 116f falls on hologram 100i designed as a transmission hologram. Transmission hologram 100i is designed to diffract only light beams having a certain wavelength and/or a certain incidence angle and to deflect them onto pixel 125a. The wavelength may correspond to the wavelength of the color red, for example, whereby the generation of a monochrome color map is made possible.

Figure 4:
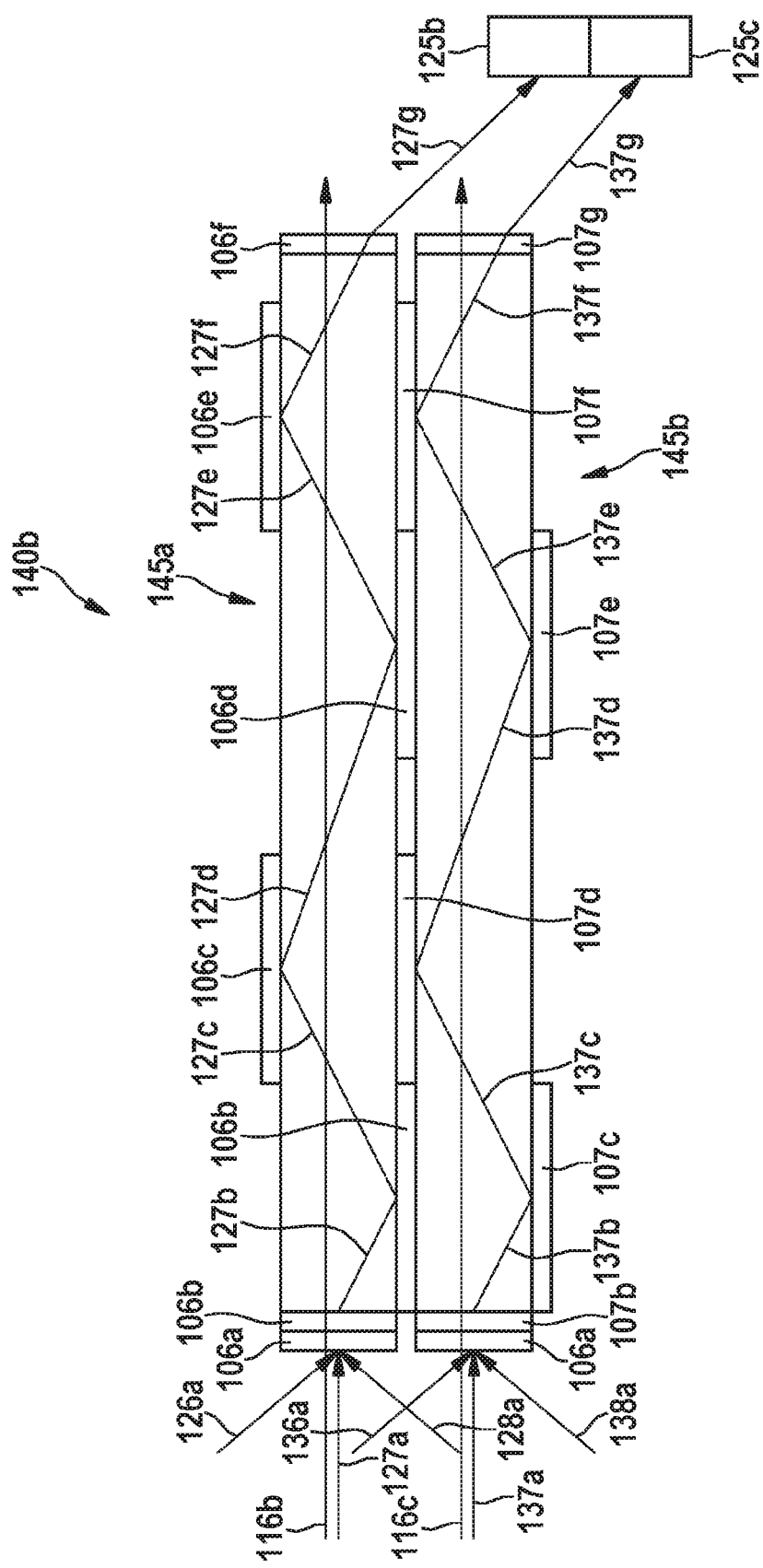
FIG. 4 shows a second specific embodiment of a holographic cascade filter.

In contrast to FIG. 3, FIG. 4 shows a holographic cascade filter 140b, which has a straight shape and includes two waveguides 145a and 145b for two pixels 125b and 125c.

In this second specific embodiment of a holographic cascade filter 140b in accordance with the present invention, a further reflection hologram 106a is connected upstream from each of the two transmission holograms 106b and 107b, which filters undesirable signals, such as interfering signals, out of the optical path. The two subsequent transmission holograms 106b and 107b are designed to diffract light beams 127b or 137b having a wavelength range and/or an entrance angle range different from one another and to reflect them in the direction of the following reflection hologram 106b or 107c. Thereafter, as in FIG. 3, multiple deflections occur onto further reflection holograms 106c, 106d, 106d at upper waveguide 145a and onto reflection holograms 107d, 107e and 107f at lower waveguide 145b. Finally, the deflected light beam 127f reaches the transmission hologram 106f at upper waveguide 145a and is deflected from there onto pixel 125b. The deflected light beam 137f finally reaches transmission hologram 107g at lower waveguide 145b and is deflected from there onto pixel 125c. In this way, it is possible to guide light beams having different wavelengths, and thus also different colors, onto the assigned pixels.

Figure 5:
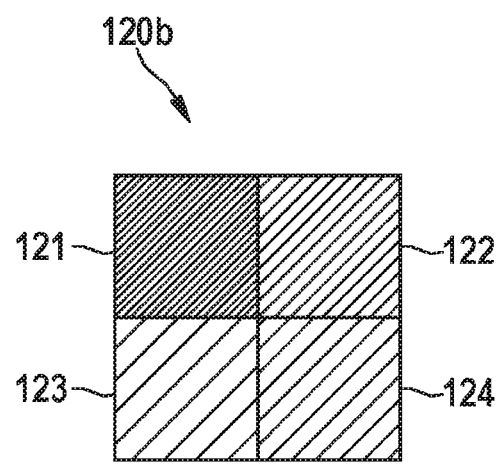
FIG. 5 shows a specific embodiment of an image sensor according to the present invention.

FIG. 5 schematically shows an image sensor as it may be used by way of example in the above-described device. The image sensor includes a blue pixel 121, a green pixel 123 and a red pixel 124. Image sensor additionally includes an infrared pixel in the process.

Figure 6:
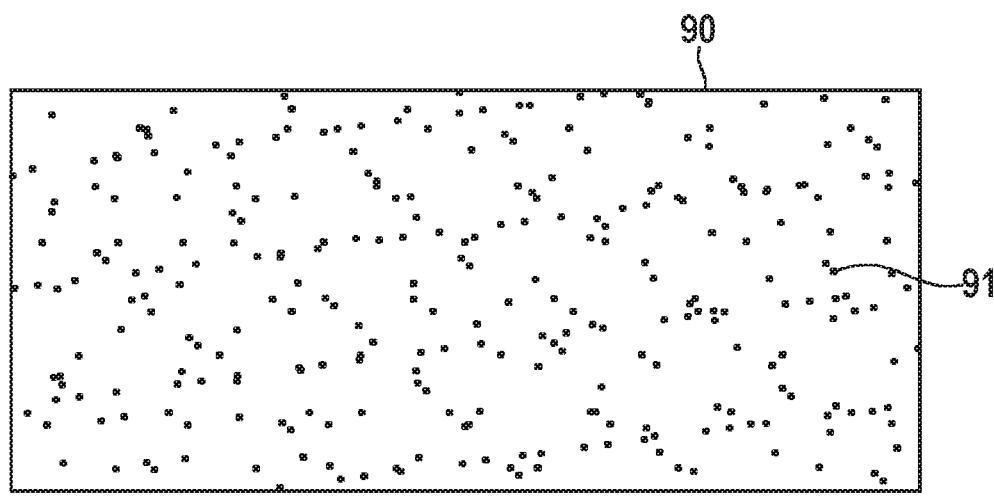
FIG. 6 schematically shows a generated mapping which was generated from at least one detected image signal.

FIG. 6, by way of example, schematically shows a generated mapping 90 which was generated from at least one detected image signal. Mapping 90 is represented as a monochrome color map 90, and the white dots 91 on the mapping stem from light beams deflected with the aid of a hologram structure onto the image sensor. Such a pattern on the mapping arises, for example, in the case of rain drops and/or dust on an outer surface of the transparent cover.

Figure 7:
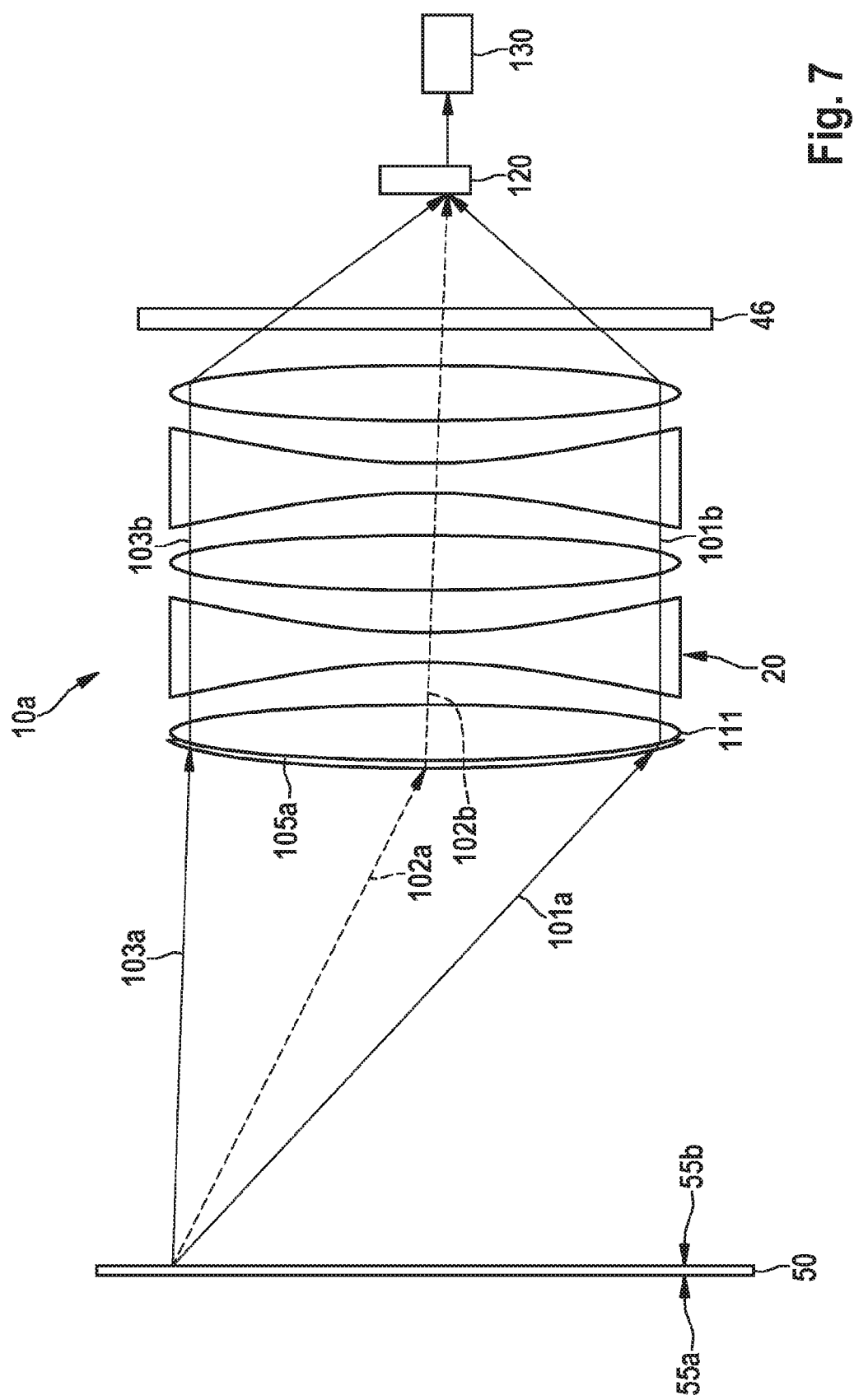
FIG. 7 shows a first specific embodiment of the optical sensor according to the present invention.

FIG. 7, in the side view, schematically shows a first specific embodiment of the optical sensor 10a according to the present invention. Optical sensor 10a is designed as a LIDAR sensor in this specific embodiment. It is represented by way of example how light beams 101a, 102a and 103a, which are incident on transparent cover 50 at different incidence angles, thereupon strike a hologram structure 105. Hologram structure 105a is designed as a transmission hologram in this specific embodiment, and is situated on a curved outer side of a lens 110 of a receiving lens system 20 of the LIDAR sensor. Hologram structure 105a deflects light beams 101a, 102a and 103a in such a way that deflected light beams 101b, 102b and 103b, in turn, are guided in receiving lens system 20 in such a way that the deflected light beams 101b, 102b and 103b finally strike image sensor 120. The image sensor of LIDAR sensor 10a is used as image sensor 120 in the process. To filter out possible interfering signals of the deflected light beams 101b, 102b and 103b, an interfering signal filter 46 is situated in front of image sensor 120. Image sensor 120 is, in turn, designed to detect at least one image signal as a function of the deflected light beams. The downstream processing unit 130 in this specific embodiment, in turn, detects a possible soiling of transparent cover 50 as a function of the at least one detected image signal.

Figure 8:
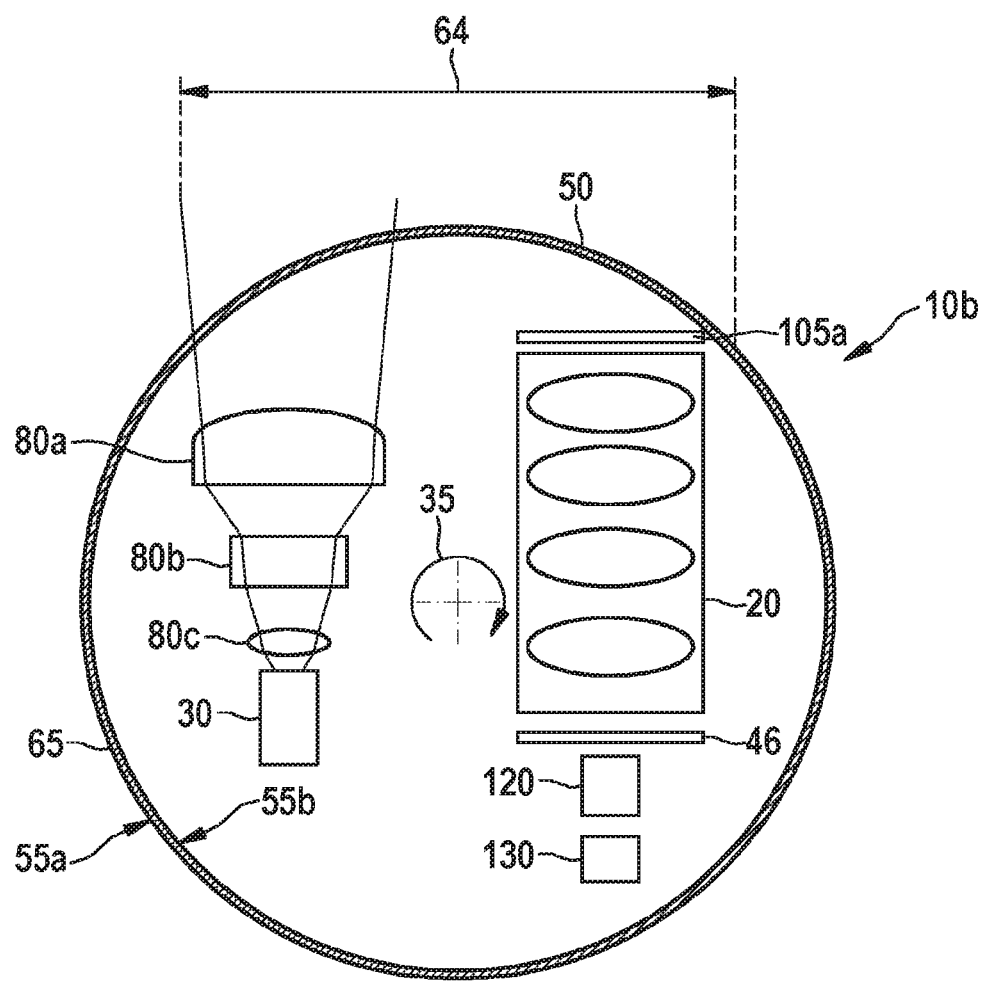
FIG. 8 shows a second specific embodiment of the optical sensor according to the present invention.

FIG. 8, in the top view, shows a second specific embodiment of the optical sensor 10b according to the present invention. In addition to the device according to the present invention including hologram structure 105b, image sensor 120 and processing unit 130, optical sensor 10b, which is also designed as a LIDAR sensor, includes a housing 65. A certain area of the circular housing 65 is designed as open toward the outside and thus forms transmitting and/or receiving window 64 of optical sensor 10b. Transmitting and/or receiving window 64 is covered by a transparent cover 50 with respect to exterior surroundings of optical sensor 10b. During the signal generation and signal detection, the circular housing 65 rotates together with transparent cover 50. Laser 30 generates infrared radiation 40, for example, which is directed with the aid of transmitting lens system 80a, 80b and 80c and emitted to the outside into the surroundings. Light beams which are incident through transparent cover 50 are at least partially deflected with the aid of hologram structure 105b onto image sensor 120.

Figure 9:
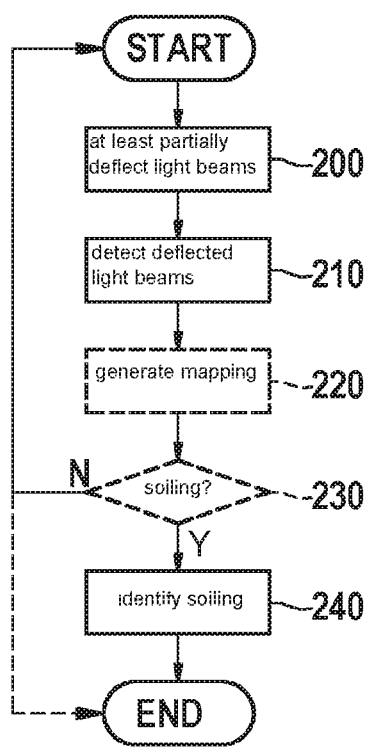
FIG. 9 shows one specific embodiment of the method according to the present invention.

FIG. 9 shows one specific embodiment of a method for detecting a soiling of a transparent cover of at least one transmitting window and/or one receiving window of an optical sensor. The method is carried out with the aid of a device according to the present invention. In a first method step 200, light beams incident through a transparent cover, or light beams reflected at an inner side of the transparent cover, are at least partially deflected in the direction of an image sensor with the aid of at least one hologram structure. In a subsequent method step 210, the deflected light beams are detected with the aid of the image sensor. Thereafter, in a method step 240, a soiling of the transparent cover is identified with the aid of a processing unit, as a function of the at least one detected image signal.

In a method step 220 following method step 210, a mapping of a surface of the transparent cover is optionally generated as a function of the at least one detected image signal. In a subsequent method step 230, it is checked whether a soiling of the transparent cover is apparent on the generated mapping. If a soiling of the surface on the transparent cover is apparent, the method is continued with method step 240. However, if no soiling is apparent, the method is restarted or optionally ended.

What is claimed is:

1. A device configured to detect a soiling of a transparent cover of at least one transmitting window and/or one receiving window of an optical sensor, the device comprising:
   at least one hologram structure;
   an image sensor; and
   a processing unit;
   wherein the at least one hologram structure is configured to at least partially deflect light beams incident through the transparent cover, or light beams reflected by an inner side of the transparent cover, in a direction of the image sensor, wherein the image sensor is configured to detect at least one image signal as a function of the deflected light beams, and wherein the processing unit is configured to detect a soiling of the transparent cover as a function of the at least one detected image signal, wherein the image sensor is a CCD image sensor, the CCD image sensor including a multitude of pixels, each of the pixels being assigned a defined area of the transparent cover to be imaged, the at least one hologram structure being configured to deflect the light beams incident in the defined areas of the transparent cover to be imaged, or the light beams reflected at the defined areas of the inner side of the transparent cover, onto the assigned pixels of the CCD image sensor.

2. The device as recited in claim 1, wherein the optical sensor is an optical surroundings sensor of a vehicle.

3. The device as recited in claim 1, wherein the processing unit is configured to ascertain a mapping of a surface of the transparent cover as a function of the at least one detected image signal.

4. The device as recited in claim 1, wherein the at least one hologram structure is a volume hologram, the volume hologram being configured to diffract the light beams incident through the transparent cover, or the light beams reflected by the inner side of the transparent cover, as a function of: (i) a wavelength of the light beams, and/or (ii) an incidence angle of the light beams in the direction of the image sensor.

5. The device as recited in claim 4, wherein the volume hologram includes a volume grating, the volume grating being configured to transmit the light beams incident through the transparent cover, or the light beams reflected by the inner side of the transparent cover.

6. The device as recited in claim 4, wherein the volume hologram includes a volume grating, the volume grating being configured to reflect the light beams incident through the transparent cover, or the light beams reflected by the inner side of the transparent cover, as a function of a wavelength of the incident light beams or reflected light beams and/or an incidence angle of the incident light beams or reflected light beams.

7. The device as recited in claim 1, wherein the CCD image sensor includes a multitude of red, and green, and blue pixels.

8. The device as recited in claim 1, wherein the at least one hologram structure is configured as a layer including multiple superimposed holograms, the multiple holograms in each case differently diffracting the light beams incident through the transparent cover, or the light beams reflected by the inner side of the transparent cover, as a function of: (i) a wavelength of the light beams, and/or (ii) an incidence angle of the light beams in the direction of the image sensor.

9. The device as recited in claim 1, wherein the at least one hologram structure is formed from multiple consecutively situated holograms, the multiple holograms in each case differently diffracting the light beams incident through the transparent cover, or the light beams reflected by the inner side of the transparent cover, as a function of; (i) a wavelength of the light beams, and/or (ii) an incidence angle of the light beams in the direction of the image sensor.

10. The device as recited in claim 1, further comprising:
at least one first illumination unit configured to illuminate the inner side of the transparent cover in such a way that light beams emitted by the first illumination unit are reflected at the inner side of the transparent cover in an event of soiling of the transparent cover, the at least one hologram structure being configured to at least partially deflect the light beams emitted by the first illumination unit and reflected at the inner side of the transparent cover in the direction of the image sensor.

11. The device as recited in claim 1, further comprising:
at least one second illumination unit configured to illuminate an outer side of the transparent cover in such a way that light beams emitted by the second illumination unit are reflected at the outer side in an event of soiling of the transparent cover, the at least one hologram structure being configured to at least partially deflect the light beams emitted by the second illumination unit and incident through the outer side of the transparent cover in the direction of the image sensor.

12. The device as recited in claim 1, further comprising:
at least one third illumination unit configured to illuminate the transparent cover laterally from above or from below the transparent cover in such a way that light beams emitted by the third illumination unit are deflected in a direction of the hologram structure in the event of soiling of the transparent cover, the at least one hologram structure being configured to at least partially deflect light beams emitted by the third illumination unit and deflected in the direction of the hologram structure, in the direction of the image sensor.

13. An optical sensor, comprising:
a housing including at least one transmitting window and/or at least one receiving window of the sensor; and
a transparent cover configured to cover the at least one transmitting window and/or the at least one receiving window of the optical sensor with respect to exterior surroundings of the optical sensor; and
a device including at least one hologram structure, an image sensor, and a processing unit, the at least one hologram structure being situated inside the housing in such a way that light beams incident through the transparent cover, or light beams reflected by an inner side of the transparent cover, are at least partially deflected in a direction of the image sensor, the image sensor being situated inside the housing and configured to detect at least one image signal as a function of the deflected light beams, and the processing unit being configured to detect a soiling of the transparent cover as a function of the at least one detected image signal, wherein the image sensor is a CCD image sensor, the CCD image sensor including a multitude of pixels, each of the pixels being assigned a defined area of the transparent cover to be imaged, the at least one hologram structure being configured to deflect the light beams incident in the defined areas of the transparent cover to be imaged, or the light beams reflected at the defined areas of the inner side of the transparent cover, onto the assigned pixels of the CCD image sensor.

14. The optical sensor as recited in claim 13, wherein the optical sensor is an optical surroundings sensor.

15. The optical sensor as recited in claim 13, wherein the optical sensor is a LIDAR sensor.

16. The optical sensor as recited in claim 15, wherein the hologram structure is situated on a curved outer side of a lens of a receiving lens system of the LIDAR sensor.

17. A method for detecting a soiling of a transparent cover of at least one transmitting window and/or one receiving window of an optical sensor, comprising the following steps:
at least partially deflecting light beams incident through the transparent cover, or light beams reflected at an inner side of the transparent cover, in a direction of an image sensor using at least one hologram structure;
detecting at least one image signal using the image sensor; and
detecting a soiling of the transparent cover as a function of the at least one detected image signal using a processing unit, wherein the image sensor is a CCD image sensor, the CCD image sensor including a multitude of pixels, each of the pixels being assigned a defined area of the transparent cover to be imaged, the at least one hologram structure being configured to deflect the light beams incident in the defined areas of the transparent cover to be imaged, or the light beams reflected at the defined areas of the inner side of the transparent cover, onto the assigned pixels of the CCD image sensor.

\* \* \* \* \*